United States Patent [19]
Archer

[11] Patent Number: 5,859,519
[45] Date of Patent: Jan. 12, 1999

[54] SINGLE PHASE MOTOR DRIVE

[75] Inventor: William R. Archer, Fort Wayne, Ind.

[73] Assignee: General Electric Company, Schenectady, N.Y.

[21] Appl. No.: 865,135

[22] Filed: May 29, 1997

[51] Int. Cl.$^6$ ............................................. H02P 5/34
[52] U.S. Cl. ........................ 318/801; 363/41; 363/56; 363/17; 363/132; 363/21; 318/254
[58] Field of Search ................................. 363/91, 63, 94, 363/98, 95, 41, 132, 24; 388/811, 804; 318/439, 65, 135, 254, 811, 294, 293, 696; 321/9

[56] References Cited

U.S. PATENT DOCUMENTS

| | | | |
|---|---|---|---|
| Re. 33,655 | 8/1991 | Hershberger | 68/23.7 |
| 3,134,385 | 5/1964 | Cushing | 135/58 |
| 3,958,171 | 5/1976 | Sekino | 363/41 |
| 4,300,081 | 11/1981 | Van Landingham | 318/811 |
| 4,313,076 | 1/1982 | Rathje | 318/790 |
| 4,325,011 | 4/1982 | Peterson | 318/811 |
| 4,379,984 | 4/1983 | Muller | 318/254 |
| 4,410,935 | 10/1983 | Dang | 363/98 |
| 4,439,806 | 3/1984 | Brajder | 361/98 |
| 4,535,275 | 8/1985 | Müller | 318/254 |
| 4,594,650 | 6/1986 | Kinbara | 363/58 |
| 4,626,755 | 12/1986 | Butcher et al. | 318/473 |
| 4,633,358 | 12/1986 | Nagano | 361/31 |
| 4,635,349 | 1/1987 | Rabe | 29/596 |
| 4,724,678 | 2/1988 | Pohl | 62/80 |
| 4,748,388 | 5/1988 | Müller | 318/254 |
| 4,757,241 | 7/1988 | Young | 318/254 |
| 4,757,603 | 7/1988 | Stokes | 29/598 |
| 4,763,239 | 8/1988 | Ball | 363/98 |
| 4,786,822 | 11/1988 | Steely | 307/125 |
| 4,866,586 | 9/1989 | Suko | 363/5 |
| 4,879,641 | 11/1989 | Rossi et al. | 363/98 |
| 4,933,584 | 6/1990 | Harms et al. | 310/162 |
| 4,937,725 | 6/1990 | Dhyanchand et al. | 363/56 |
| 4,989,114 | 1/1991 | Storti et al. | 361/84 |
| 5,057,720 | 10/1991 | Hattori | 307/571 |
| 5,125,347 | 6/1992 | Erdman | 388/811 |
| 5,140,243 | 8/1992 | Lyons et al. | 318/701 |
| 5,309,347 | 5/1994 | Poma | 363/63 |
| 5,349,275 | 9/1994 | Müller | 318/254 |
| 5,365,118 | 11/1994 | Wilcox | 327/109 |
| 5,369,563 | 11/1994 | Miller | 363/56 |
| 5,376,866 | 12/1994 | Erdman | 318/138 |
| 5,408,150 | 4/1995 | Wilcox | 327/108 |
| 5,418,438 | 5/1995 | Hollenbeck | 318/432 |
| 5,423,192 | 6/1995 | Young et al. | 62/228 |
| 5,465,019 | 11/1995 | Kliman | 310/156 |
| 5,483,139 | 1/1996 | Welles, II | 318/782 |
| 5,492,273 | 2/1996 | Shah | 236/44 A |

*Primary Examiner*—William M. Shoop, Jr.
*Assistant Examiner*—Rita Leykin
*Attorney, Agent, or Firm*—Senniger, Powers, Leavitt & Roedel; Wayne O. Traynham

[57] ABSTRACT

A motor having a stationary assembly including a winding and a rotatable assembly in magnetic coupling relation to the stationary assembly. A bridge circuit for use in driving the motor has upper and lower power switches connected between the winding and the upper and lower rails, respectively, of a power supply link. Each of the lower switches corresponds to one of the upper switches and each of the switches has a conducting state and a nonconducting state. The motor also has a control circuit for generating a motor control signal to control the switches. The lower switches are receiving and responsive to the motor control signal. A drive circuit drives the upper switches in response to the state of the lower switches to selectively connect the rails of the power supply link to the winding. As such, the winding is energized to produce an electromagnetic field for rotating the rotatable assembly relative to the stationary assembly. The drive circuit controls the upper switches to provide a delay interval between the conducting states of the corresponding upper and lower switches thereby reducing shoot-through currents.

24 Claims, 3 Drawing Sheets

SINGLE PHASE MOTOR DRIVE

BACKGROUND OF THE INVENTION

This invention relates generally to motor systems and, particularly, to an improved gate drive for a single phase electronically commutated motor.

In general, a motor such as an electronically commutated or brushless motor has permanent magnets mounted on its rotor. The stator of such a motor has a plurality of teeth and wire-wound coils on the teeth which, when energized with current, interact with the permanent magnet rotor to produce positive or negative torque, depending on the direction of the current with respect to the polarity of the magnets. The polarity of the magnets relative to the stator winding alternates when the rotor moves unidirectionally. Thus, alternating the direction of the stator current in synchronism maintains a constant direction of torque. An electronic inverter bridge typically controls energization of the stator winding for controlling the direction and amount of torque produced by the motor as well as the rotor shaft speed.

For example, a brushless DC motor system typically has an inverter bridge for driving the motor. The inverter bridge has a number of power switching devices with a flyback diode coupled to each of the devices and is used to connect the motor's windings to a power supply through a power supply link. The power supply link has positive and negative rails connecting the motor to the power supply. Generally, such a motor system provides pulse width modulation of the power to the windings by turning on and off one of the power switching devices. Presently available gate drives for full bridge circuits include RC circuits in which the change in voltage across a capacitance controls the conduction of the bridge circuit's diagonally-positioned transistors. These drives attempt to prevent shoot-through currents by delaying the drive signals that alternately switch the transistors, i.e., providing a "dead time" between commutation switching events. The conduction state of each of the upper two transistors of the bridge circuit often depends on the conduction state of their respective diagonally-positioned lower transistor (i.e., the lower transistor on the opposite side of the load). A capacitance connecting the bases of the two inputs of the lower transistors delay the conduction in one diagonal until after the other diagonal is turned off.

In general, brushless dc motors are disclosed in, for example, U.S. Pat. Nos. 5,423,192, 4,933,584 and 4,757,241, all of which are commonly assigned with the present invention described herein and the entire disclosures of which are incorporated herein by reference. In particular, single phase motors are disclosed in, for example, U.S. Pat. Nos. 5,483,139, 5,465,019, 5,140,243, 4,724,678, 4,635,349, 4,626,755, 4,313,076 and 3,134,385, all of which are commonly assigned with the present invention described herein and the entire disclosures of which are incorporated herein by reference.

SUMMARY OF THE INVENTION

Among the several objects of this invention may be noted the provision of an improved motor system which reduces shoot-through currents in its inverter bridge; the provision of such motor system which eliminates the use of high voltage gate level shifters for driving the inverter bridge; the provision of such motor system which permits control of the upper power switches of the inverter bridge in response to the states of the lower power switches; the provision of such motor system which does not have pulse width modulation switching losses associated with the upper power switches; and the provision of such a motor system which is economically feasible and commercially practical.

Briefly described, a motor system embodying aspects of the invention has a stationary assembly including a winding and a rotatable assembly in magnetic coupling relation to the stationary assembly. The motor system also includes a power supply link having upper and lower rails supplied by a power supply and a bridge circuit having upper and lower power switches connected between the winding and the upper and lower rails, respectively. Each lower switch corresponds to one of the upper switches and each switch has a conducting state and a nonconducting state. The motor system further includes a control circuit for generating a motor control signal to control the switches. The lower switches are receiving and responsive to the motor control signal and a drive circuit is responsive to the state of the lower switches for driving the upper switches. The switches selectively connect the rails of the power supply link to the winding to energize it for producing an electromagnetic field which causes the rotatable assembly to rotate relative to the stationary assembly. The drive circuit controls the upper switches to provide a delay interval between the conducting states of the corresponding upper and lower switches thereby reducing shoot-through currents.

Another embodiment of the invention is directed to an inverter bridge for driving a motor. The motor has a stationary assembly including a winding and a rotatable assembly in magnetic coupling relation to the stationary assembly. The motor also includes a power supply link having upper and lower rails supplied by a power supply and a control circuit for generating a motor control signal to control commutation of the winding. The bridge includes a set of upper power switches connected between the winding and the upper rail and a set of lower power switches connected between the winding and the lower rail. Each lower switch corresponds to one of the upper switches is receiving and responsive to the motor control signal. Each switch has a conducting state and a nonconducting state. The bridge also includes a drive circuit responsive to the state of the lower switches for driving the upper switches. The switches selectively connect the rails of the power supply link to the winding to energize it for producing an electromagnetic field which causes the rotatable assembly to rotate relative to the stationary assembly. The drive circuit controls the upper switches to provide a delay interval between the conducting states of the corresponding upper and lower switches thereby reducing shoot-through currents.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
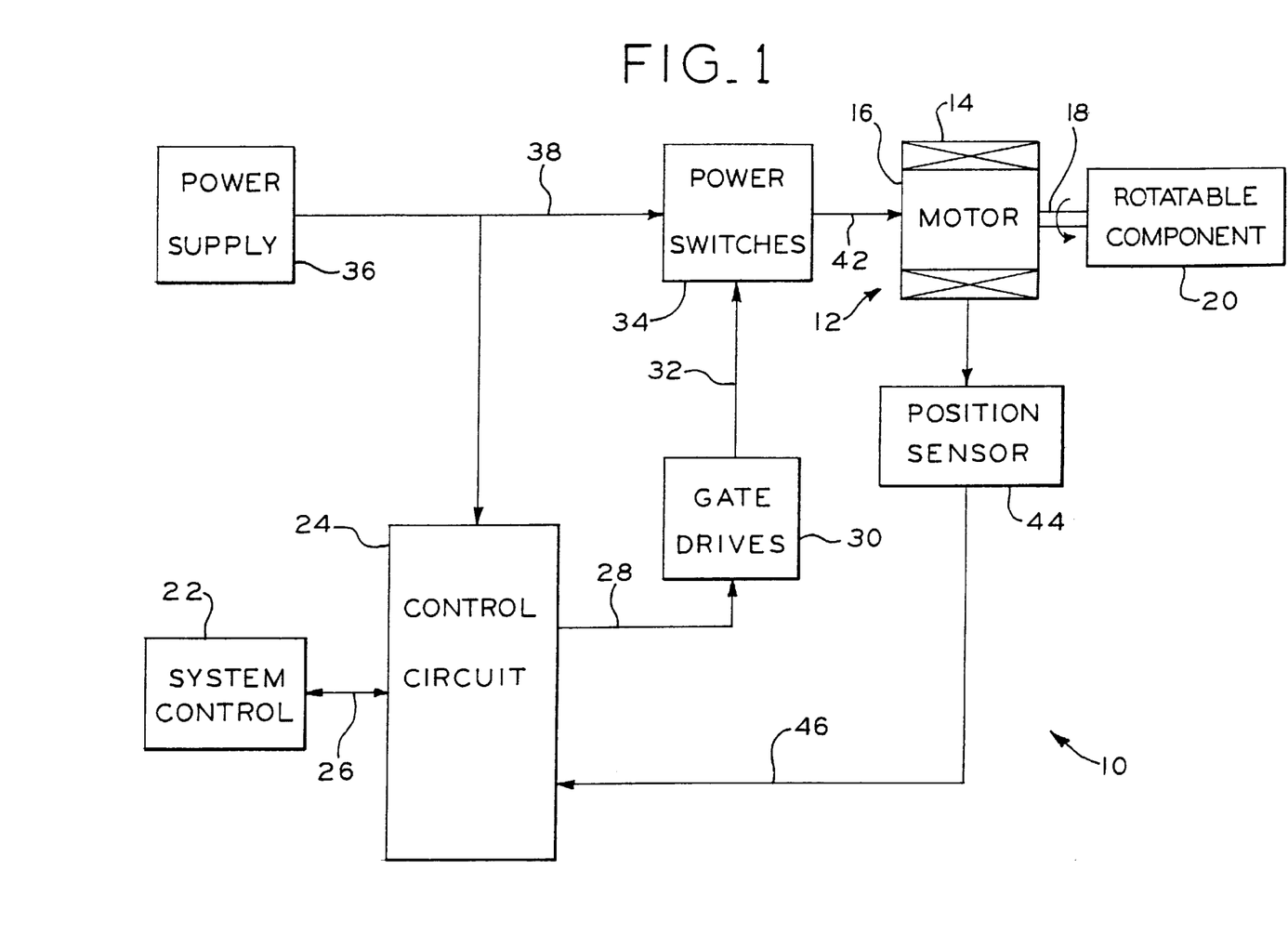
FIG. 1 is a block diagram of a motor system according to a preferred embodiment of the invention.

Referring now to the drawings, FIG. 1 shows a motor system 10 according to a preferred embodiment of the present invention. The system 10 includes a motor, generally designated 12, having a stationary assembly, or stator, 14 and a rotatable assembly, or rotor, 16 in magnetic coupling relation to the stator 14. In the embodiment described herein, the motor 12 is a single phase, electronically commutated permanent magnet motor. It is to be understood, however, that aspects of the present invention may be applied to any electronically controllable motor or dynamoelectric machine typically powered by an electronic control circuit. Such motors include, for example, external rotor motors (i.e., inside out motors), permanent magnet motors, single and variable speed motors, selectable speed motors having a plurality of speeds, brushless dc motors, electronically commutated motors, switched reluctance motors and induction motors. In addition, the motors may be multi-phase or single phase motors and, in any case, such motors may have a single split phase winding or a multi-phase winding. Such motors may also provide one or more finite, discrete rotor speeds selected by an electrical switch or other control circuit.

In a preferred embodiment of the invention, a motor shaft 18 mechanically connects the rotor 16 to a particular device to be driven, such as a rotatable component 20. For example, the rotatable component 20 comprises a fan, blower, compressor or the like for use in a heating, ventilating and air conditioning system or refrigeration system. Although motor 12 is particularly useful for driving a fan, it is to be understood that motor 12 may be part of a number of different systems for driving other rotatable components. For example, rotatable component 20 may be an agitator and/or basket of a vertical axis washing machine or a basket of a horizontal axis or center-post-agitate washing machine. In addition, rotatable component 20 may also include a connection mechanism for coupling it to the shaft 18. Commonly assigned U.S. Pat. Nos. RE 33,655, 5,492,273, 5,418,438, 5,423,192, and 5,376,866, the entire disclosures of which are incorporated herein by reference, describe various rotatable components for which the present invention is suited for use.

Preferably, a user interface, or system control, 22 provides system control signals to a control circuit 24 via line 26. In this instance, the system control signals take the form of motor commands representing, for example, turn on and turn off commands as well as desired fan speeds. In response to the system control signals, the control circuit 24 then generates motor control signals. As represented by the block diagram of FIG. 1, control circuit 24 provides the motor control signals via line 28 for electronically controlling a plurality of gate drives 30. In turn, the gate drives 30 provide drive signals via line 32 for switching a plurality of power switches 34, such as insulated gate bipolar transistors, bipolar junction transistors or metal oxide silicon field effect transistors. In addition to providing sufficient voltage (e.g., 15 volts) for driving the power switches 34, gate drives 30 also condition the signals provided by control circuit 24 for optimal operation of power switches 34. In a preferred embodiment of the invention, control circuit 24 is embodied by a microprocessor or microcontroller and/or an application specific integrated circuit (ASIC) or universal electronically commutated motor integrated circuit (UECM IC).

As shown in FIG. 1, a power supply 36 provides high voltage dc power via line 38 to power switches 34. By selectively switching the power supply 36 in connection with a motor winding 40 (see FIG. 2) included in stator 14, power switches 34 provide power via line 42 to motor 12. Preferably, power switches 34 energize motor winding 40 in a preselected sequence for commutating motor 12 in response to control circuit 24. In this instance, control circuit 24 selectively activates power switches 34 to control rotation in motor 12 as a function of the motor control signals. It is to be understood that power supply 36 may also provide power to operate control circuit 24.

Referring further to FIG. 1, a position sensor 44 provides control circuit 24 with feedback via line 46 representative of the angular position of rotor 16 relative to stator 14. For example, the position sensor 44 comprises one or more Hall sensors providing a rotor position feedback signal. In general, the position signal has a predefined angular relationship relative to the motor back electromotive force (EMF) (e.g., in phase or approximately 90° out of phase with the back EMF) of motor 12. Other position sensors, such as optical sensors, may also be used to provide rotor position feedback instead of or in addition to the Hall sensors. For example, commonly assigned application Ser. No. 08/680,010, filed Jul. 15, 1996, the entire disclosure of which is incorporated herein by reference, describes a quadrature winding suitable for generating a position signal in a single phase motor such as motor 12.

Preferably, control circuit 24 generates its control signals as a function of the zero crossings of the back EMF of winding 40. In this instance, the product of the current and the back EMF determines torque production in motor 12. By energizing winding 40 when the back EMF has crossed zero in the direction that will oppose the voltage energizing it, motor 12 sustains positive torque. Since it is desired that motor current crosses zero at the time the motor back EMF also crosses zero, control circuit 24 preferably commutates motor 12 at an angle relative to the next back EMF zero crossing. In other words, control circuit 24 estimates subsequent back EMF zero crossings based on the sensed position of rotor 16 and generates gate drive signals at line 32 for driving power switches 34 coincident with or in advance of the estimated back EMF zero crossings. Thus, control circuit 24 generates the motor control signals as a function of the sensed position of rotor 16 as represented by the position signal. As an example, commonly assigned U.S. Pat. No. 5,423,192, the entire disclosure of which is incorporated herein by reference, describes one preferred means for detecting zero crossings.

In operation, control circuit 24 implements a state machine for generating signals that define desired commutation intervals in response to the system control signals. When power switches 34 are switched in response to the motor control signals, system 10 produces a motor current that matches the load torque demand as a function of a regulated current reference level. By matching torque load with produced torque, motor 12 is able to operate at a desired torque or speed. The control signals preferably include a series of pulse width modulated cycles, wherein each cycle causes a corresponding switching event of power switches 34. In turn, the current in winding 40 produces an electromagnetic field for rotating the rotor 16 of motor 12. To control the speed of rotatable component 20, system 10 preferably controls the power delivered to the load to control the speed of motor 12. In particular, system 10 regulates current in motor 12, which in turn regulates torque, to obtain the desired motor speed by matching the load and motor loss demand torque at the desired speed.

In one embodiment, the regulated current reference level is a peak regulated current for normal motoring operation communicated by a pulse width modulated regulation signal (see FIG. 3C) having a variable duty cycle representative of the desired current level. For example, the duty cycle of may vary from 0% to 100% where 100% corresponds to a maximum peak regulated current value and the duty cycle is proportional to the desired current in motor 12. In the alternative, control circuit 24 generates a variable voltage signal, the magnitude of which represents the desired current. Other suitable means for providing the peak regulated current level include a simple resistor circuit or potentiometer.

Commonly assigned application Ser. No. 08/647,694, filed May 15, 1996, the entire disclosure of which is incorporated herein by reference, discloses a system for regulating motoring current and controlling circulating currents in a single phase motor. Commonly assigned application Ser. No. 08/760,470, filed Dec. 5, 1996, the entire disclosure of which is incorporated herein by reference, describes a suitable motor and control for use with the present invention.

Figure 2:
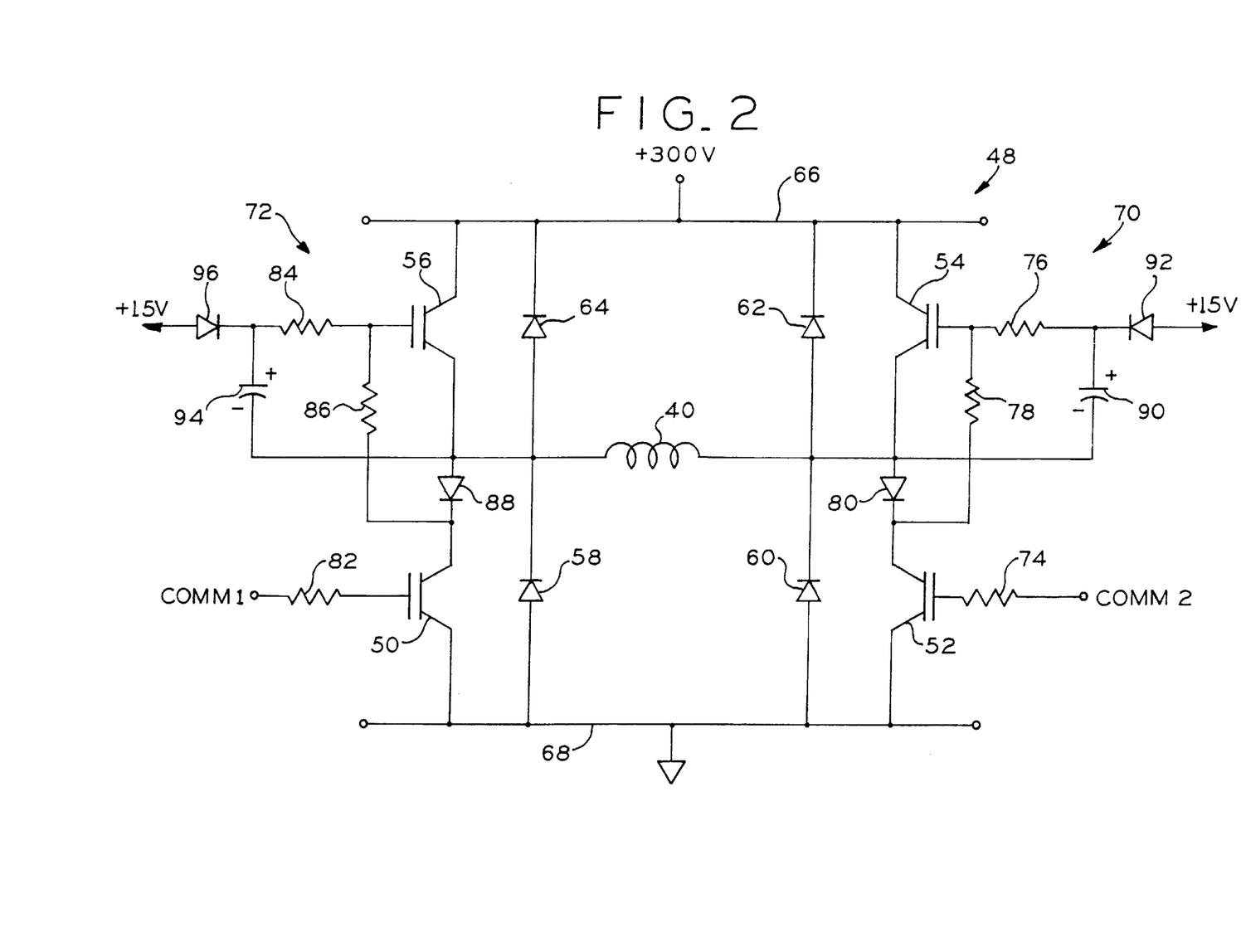
FIG. 2 is a schematic diagram of an inverter bridge for driving the motor of FIG. 1.

Referring now to FIG. 2, an inverter bridge circuit 48 having two lower switches 50, 52 and two upper switches 54, 56 that form the arms of an H-bridge configuration embodies power switches 34 (FIG. 1). Flyback diodes 58, 60, 62, 64 are coupled in an anti-parallel relationship with each switch 50, 52, 54, 56, respectively, as shown in FIG. 2. The inverter bridge circuit 48 also has a positive, or upper, rail 66 and a negative, or lower, rail 68 supplied by power supply 36. A shunt resistor, current transformer, Hall-effect current sensor, integrated current sensor or other sensor or circuit known in the art may be used to sense the winding or motoring current of motor 12. It is to be understood that rails 66, 68, constitute a power supply link, also indicated by lines 38, 42, for providing power to the motor winding 40.

In addition, FIG. 2 illustrates a gate drive circuit, generally indicated 70, that is associated with the right side or arm of bridge circuit 48 (i.e., switches 52, 54) and a gate drive circuit, generally indicated 72, that is associated with the left side or arm of bridge circuit 48 (i.e., switches 50, 56). Although power switches 34, line 32 and gate drives 30 are illustrated separately in FIG. 1 for simplicity, it is to be understood that the bridge circuit 48 of FIG. 2 embodies aspects of each of these components.

A preferred excitation scheme for motor 12 involves commanding two switches on during each commutation interval, one from lower switches 50, 52 and one from upper switches 54, 56. Motor 12 is driven with a generally symmetrical square wave of current. This means that switches 50, 54 conduct during alternate 50% half cycles and switches 52, 56 conduct during the other 50% half cycles. In mechanical terms, the power switches 34 of bridge circuit 48 perform the "commutator" function of a brush-type DC motor. In particular, control circuit 24 generates a suitable commutation signal to turn on one of lower switches 50, 52 and a diagonally-positioned one of upper switches 54, 56. By activating power switches 34 in diagonal pairs, the bridge circuit 48 connects motor winding 40 to upper and lower rails 66, 68 and, thus, connects it to power supply 36. In normal operation, control circuit 24 also selects one of the active power switches 34 to be used for controlling the motor current. In a preferred embodiment, the selected switch performs pulse width modulation (PWM) of the power applied to winding 40 to control the motor current. Although the conduction time of one or both of the conducting power switches may be pulse width modulated for controlling the current provided to motor winding 40 during any given half cycle, lower switches 50, 52 are pulse width modulated in the embodiment of FIG. 2. For example, the active lower switch 50 or the active lower switch 52 is used for PWM during normal motoring operation. Commonly assigned U.S. Pat. No. 4,757,603, the entire disclosure of which is incorporated herein by reference, shows an exemplary PWM control of a motor.

As an example of the operation of motor 12, control circuit 24 provides control signals to enable a pair of power switches 34 (i.e., switches 50, 54 or switches 52, 56), each on an opposite side of winding 40. One of the two active switches (e.g., switch 50 or switch 52) performs PWM while the other (e.g., switch 54 or switch 56) remains in its on, or conducting, state for the entire commutation interval as commanded by the commutation logic. The polarity of the motor back EMF during this time interval is counter to the supply voltage so that the driving electromotive force to develop current in motor 12 is the supply minus the back EMF. In the illustrated embodiment, control circuit 24 applies control signals to switches 50, 52 as a function of the commutation and regulation signals. For example, a pulse width modulated signal is applied to switch 50 while a logic level low signal is applied to switch 52, and vice-versa.

As shown in FIG. 2, control circuit 24 applies a voltage to the base of switch 52 through a resistor 74 to control the transistor's switching. In a preferred embodiment of the invention, the value of the lower turn-on resistor 74 is selected to cause lower switch 52 to turn on relatively slowly with respect to the speed at which upper switch 54 turns off. In a similar manner, an upper turn-on resistor 76, the value of which is much greater than that of resistor 74, causes upper switch 54 to turn on more slowly than the speed at which lower switch 52 turns off.

A turn-off resistor 78 determines the speed at which upper switch 54 turns off. In this instance, a diode 80 carries current from motor winding 40 when lower switch 52 is conducting. This current pulls down the turn-off resistor 78 which, in turn, biases the base of upper switch 54 to make sure that switch 54 remains off so long as switch 52 is on. In other words, resistor 78 is connected to a −0.6 volt level relative to the emitter of the transistor embodying switch 54. Further, the value of resistor 78 is preferably chosen so that the gate-source capacitance of switch 54 is discharged rapidly. As an example, a time constant of 100 nanoseconds (i.e., 1000 pf * 100 Ω) is used. This combination of the diode 80 and resistors 74, 76, 78 of the gate drive circuit 70 prevents, or minimizes, shoot-through currents which result if both switches 52, 54 are conducting at the same time. The motor current is commutated and regulated by the direct switching of only lower switches 50, 52. The states of upper switches 54, 56 automatically complement the states of lower switches 50, 52.

In the illustrated embodiment, the gate drive circuit 72 includes resistors 82, 84, 86 in combination with a diode 88. This combination of resistors 82, 84, 86 and diode 88 reduce shoot-through currents in switches 50, 56 in a manner similar to resistors 74, 76, 78 and diode 80.

FIG. 2 also illustrates preferred charge-pump circuitry for turning on upper switch 54 when lower switch 52 is turned off. Preferably, a capacitor 90 charges to +15 volts via a diode 92 when switch 52 is conducting. As a result, the voltage across the capacitor 90 turns on upper switch 54 when lower switch 52 is turned off. Similarly, a capacitor 94 and a diode 96 turn on upper switch 56 when lower switch 50 is turned off.

Thus, for each arm of bridge circuit 48 (i.e., the upper and lower switches on the same side of the load), the state of the upper switch (i.e., switch 54 or switch 56) depends on the state of its corresponding lower switch (i.e., switch 52 or switch 50, respectively). In addition, the gate drive circuits 70, 72 of bridge circuit 48 cause the upper switch of each arm to turn on at a slower rate than the rate that its corresponding lower switch turns off and turn off at a faster rate than the rate that its corresponding lower switch turns on. In this manner, the present invention ensures that the upper and lower switches on the same arm of bridge circuit 48 will not be conducting simultaneously and provides "hands off" control of the upper switches 54, 56.

As shown in FIG. 2, switches 34 are embodied by transistors each having a base electrode, an emitter electrode and a collector electrode. In a preferred embodiment, lower turn-on resistors 74, 82 are connected to the base electrodes of lower switches 52, 50, respectively. Similarly, upper turn-on resistors 76, 84 are connected to the base electrodes of upper switches 54, 56, respectively. The combination of capacitor 90 and diode 92, as well as the combination of capacitor 94 and diode 96, constitute charge pump circuits for turning on respective upper switch 54, 56 in response to the corresponding lower switch 52, 50 on the same arm of bridge circuit 48 turning off. As illustrated, diode 92 is connected between the upper turn-on resistor 76 and the +15 volt source and capacitor 90 is connected between diode 92 and the collector electrode of the corresponding lower switch 52. Likewise, diode 96 is connected between the upper turn-on resistor 84 and the +15 volt source and capacitor 94 is connected between diode 96 and the collector electrode of the corresponding lower switch 50.

In addition, drive circuits 70, 72 include turn-off resistors 78, 86 connected between the base electrode of the respective upper switches 54, 56 and the collector electrode of their corresponding lower switches 52, 50. As described above, each turn-off resistor 78, 86 is pulled down when lower switch 52, 50, respectively, is conducting. In this manner, drive circuits 70, 72 maintain upper switches 54, 56 in their nonconducting states as desired according to the commutation strategy.

For these reasons, the present invention is particularly suitable for controlling motor torque or speed by PWM of the lower switches 50, 52 of bridge circuit 48. As an example, upper switch 54 remains continuously on when lower switch 52 is off, i.e. when a logic level low signal is applied to the base of switch 52. Meanwhile, lower switch 50 is pulse width modulated for control purposes. Since the on state of upper switch 54 depends on the off state of lower switch 52 rather than the on or off state of lower switch 50, switch 54 remains on even when switch 50 is pulse width modulated. Advantageously, switch 54 is not switched on and off needlessly. The rates at which the switches 34 of the single phase gate drive bridge 48 turn on and turn off also provide advantages over conventional H-bridges. Particularly, the turn-off rates of upper switches 54, 56 are faster than the turn-on rates of lower switches 52, 50, respectively. This means that switch 54 will turn off before switch 52 turns on and that switch 56 will turn off before switch 50 turns on. Also, the turn-on rates of upper switches 54, 56 are slower than the turn-off rates of lower switches 52, 50, respectively. This means that switch 54 will turn on after switch 52 turns off and that switch 56 will turn on after switch 50 turns off. Thus, the gate drives embodied by bridge circuit 48 avoid shoot-through currents during PWM of the motor winding current without requiring a time gap between the control signals applied to switches 50, 52.

In contrast to conventional gate drives, bridge circuit 48 does not include the use of capacitance to produce time gaps between the drive signals applied to power switches 34, i.e., a "dead time", to prevent shoot-through current. In fact, even if both input controls of switches 50, 52 are simultaneously logic level high, shoot-through current does not result. This is because the combination of resistor 78 and diode 80 cause the state of upper switch 54 to be the opposite state of lower switch 52 on the same arm of bridge circuit 48 and because the combination of resistor 86 and diode 88 cause the state of upper switch 56 to be the opposite state of lower switch 50 on the same arm of bridge circuit 48. The use of the diode and resistor combinations to negatively bias the base of each upper transistor with respect to its emitter, as well as the selection of appropriate values of the resistors and capacitors used in circuit 48, ensures that the upper switches will turn off quickly relative to the speed at which lower switches turn on. The present invention substantially prevents shoot-through currents even if the input controls to both lower switches 50, 52 are logic level high and takes advantage of pulse width modulation of the lower two switches to control the amount of current flowing through motor winding 40. The fact that upper switches 54, 56 each remain on during the entire commutation half-cycle even when the diagonal lower switch 50, 52, respectively, is being pulse width modulated makes the above distinctions more significant.

Figure 3A:
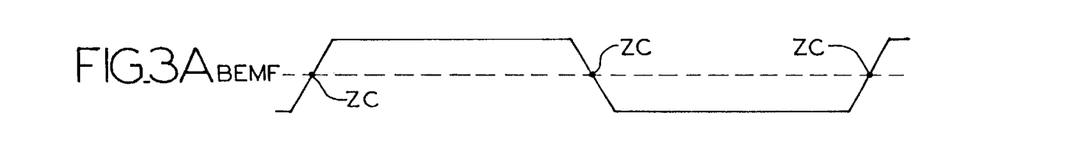
FIGS. 3A–3F are exemplary timing diagrams illustrating the relationship of back EMF and peak current in the motor of FIG. 1 to a preferred commutation strategy of the invention.
Figure 3B:
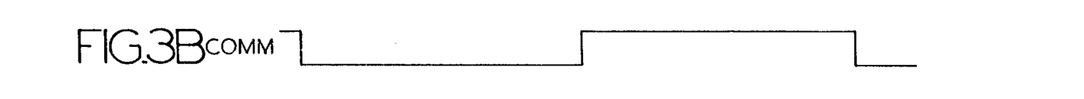
Figure 3C:
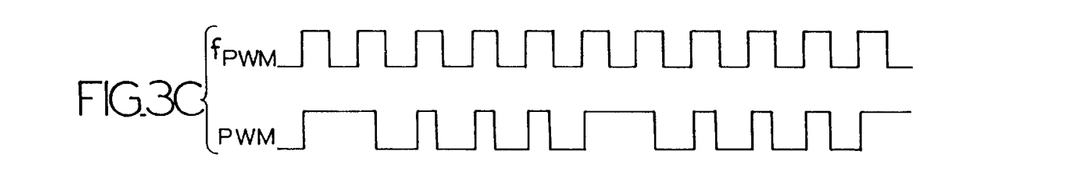
Figures 3D, 3E:
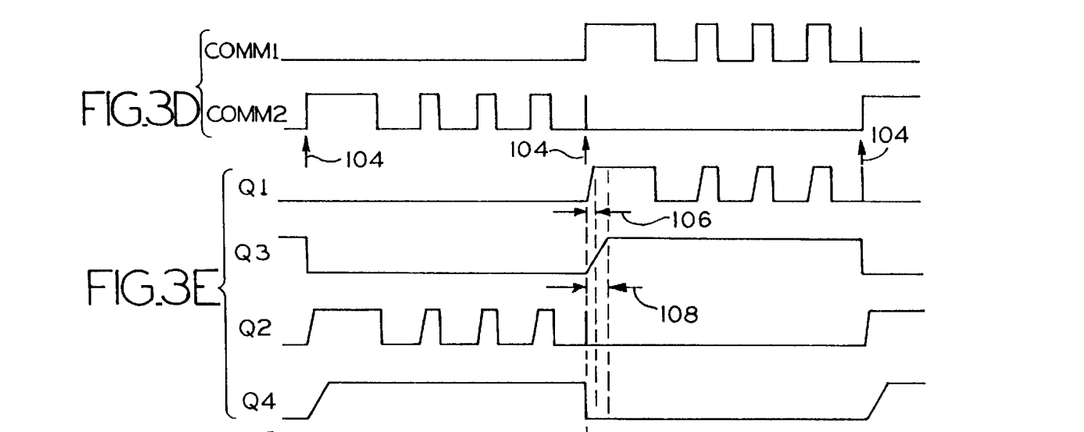
Figure 3F:
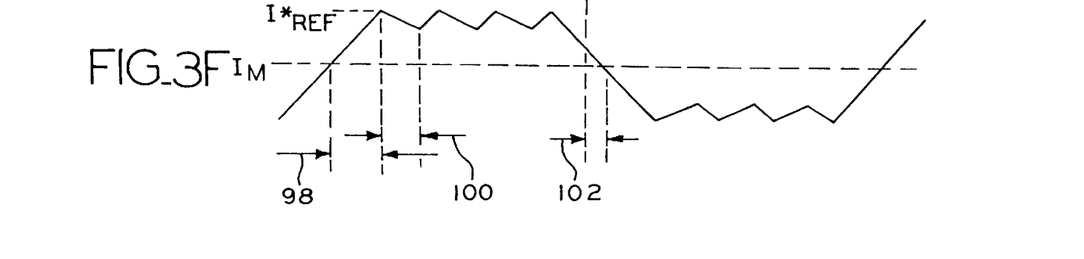

Referring to FIGS. 3A–3F, exemplary timing diagrams show the relationship between various signals and states of system 10. FIG. 3A shows an idealized back EMF waveform for winding 40 of motor 12 and indicates zero crossings at reference character ZC. As described above, control circuit 24 generates motor control signals as a function of the position of rotor 16 which may be determined as a function of the zero crossings of the back EMF. FIG. 3B illustrates an exemplary commutation signal, COMM, generated by control circuit 24. As shown, the COMM signal defines alternating commutation intervals for controlling the energization of winding 40 to rotate the rotor 16 of motor 12. In one commutation interval, or half-cycle, current flows through switch 56, winding 40 and switch 52. In the next commutation interval, current flows through switch 54, winding 40 and switch 50. FIG. 3C illustrates two exemplary signals, $f_{PWM}$ and PWM, for use in regulating current in motor 12. In one embodiment, the $f_{PWM}$ signal is a pulse train at a desired pulse width modulation frequency (e.g., 18 kHz or higher) for triggering the PWM operation of control circuit 24 and the PWM signal is a pulse width modulated representation of the motor current as compared to the peak regulated current level. FIG. 3D illustrates motor control signals generated by control circuit 24 as a function of the commutation signal, COMM, and the regulation signal, PWM, for causing commutation in motor 12. For example, the upper signal of FIG. 3D, COMM1, is a product of COMM and PWM and is used for enabling switches 50, 54; the lower signal of FIG. 3D, COMM2, is a product of the inverse of COMM and PWM and is used for enabling switches 52, 56. FIG. 3E illustrates the conducting and nonconducting states of power switches 34 as they relate to the other signals. As shown in FIG. 3E, the diagram labeled Q1 corresponds to switch 50, the diagram labeled Q2 corresponds to switch 52, the diagram labeled Q3 corresponds to switch 54, and the diagram labeled Q4 corresponds to switch 56. FIG. 3F illustrates motoring current $I_M$ which energizes winding 40 during operation of motor 12. Preferably, control circuit 24 regulates current in winding 40 as a function of the peak regulated current level by turning off and on the power supplied to winding 40 according to the PWM signal. As shown in FIG. 3F, this causes the current Im to decay from its peak value. The commanded current is indicated in FIG. 3F as $I^*_{REF}$. As described above, the commanded current in motor 12 is a function of the peak regulated current level as represented by the signal IREF.

The timing diagram FIGS. 3A–3F identify four different states in the operation of the single phase winding 40 driven by the H-bridge circuit 48. A first state, indicated at reference character 98, occurs when motor 12 is connected directly to the source voltage from power supply 36. A second state, indicated at reference character 100, occurs during a PWM off interval when the motor current $I_M$ decays while circulating in a loop set by one switch (e.g., switch 56) and one diode (e.g., diode 62). A third state, indicated at reference character 102, occurs after the next commutation instant when motor current $I_M$ decays via freewheeling diodes (e.g., diode 62 and diode 58). In this instance, the actual voltage across motor winding 40 is the supply voltage plus the back EMF. A fourth state occurs at the commutation instances, indicated at reference character 104, when all of power switches 34 are off. The diagrams of FIGS. 3A–3F also illustrate a delay interval 106 which is representative of the lower switch (e.g., switch 50) turning on at a rate slower than the rate at which the upper switch (e.g., switch 56) turns off. Likewise, a delay interval 108 represents the upper switch (e.g., switch 54) turning on at a rate slower that the rate at which the lower switch (e.g., switch 52) turns off.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motor system comprising:
   a rotatable assembly;
   a stationary assembly in magnetic coupling relation to the rotatable assembly, said stationary assembly including a winding;
   a power supply link having an upper rail and a lower rail supplied by a power supply;
   a bridge circuit including a set of upper power switches connected between the winding and the upper rail and a set of lower power switches connected between the winding and the lower rail, each of said lower switches corresponding to one of said upper switches on the same side of the winding as the lower switch, said corresponding upper and lower switches connected to the same end of the winding defining an arm of the bridge circuit, said switches each having a conducting state and a nonconducting state wherein the state of each upper switch is determined by the state of its corresponding lower switch on the same arm of the bridge circuit;
   a control circuit for generating a motor control signal to control the switches, said lower switches receiving and responsive to the motor control signal; and
   a drive circuit responsive to the state of the lower switches for driving the corresponding upper switches to selectively connect the rails of the power supply link to the winding whereby the winding is energized to produce an electromagnetic field for rotating the rotatable assembly relative to the stationary assembly, said drive circuit controlling the upper switches to provide a delay interval between the conducting states of the corresponding upper and lower switches thereby reducing shoot-through currents.

2. The motor of claim 1 wherein the motor system control signal defines commutation intervals during which one of the lower switches and one of the upper switches from different arms of the bridge circuit are conducting to connect the winding to the upper and lower rails of the power supply link and wherein the drive circuit causes each upper switch to become nonconducting before its corresponding lower switch on the same arm becomes conducting.

3. The motor system of claim 1 wherein the switches comprise transistors each having a base electrode, an emitter electrode and a collector electrode and wherein the drive circuit includes a turn-off resistor connected between the base electrode of the upper switch and the collector electrode of its corresponding lower switch, said turn-off resistor being pulled down when the lower switch is conducting whereby the upper switch is maintained in its nonconducting state.

4. The motor system of claim 1 wherein the motor control signal generated by the control circuit is a function of a regulated current level representative of a desired speed and/or torque of the motor and wherein the drive circuit is responsive to the motor control signal for driving the switches to pulse width modulate the power provided to the winding at a duty cycle which is a function of the regulated current level thereby regulating motor current in the winding to control the speed and/or torque of the motor.

5. The motor system of claim 4 wherein the control circuit is responsive to the current regulation signal for controlling the switches so that one of the lower switches is used for pulse width modulating the power provided to the winding and wherein the drive circuit maintains the upper switch on the opposite arm of the bridge circuit in its conducting state during pulse width modulation by the lower switch.

6. The motor system of claim 1 wherein the winding comprises a single phase winding and wherein the bridge circuit comprises an H-bridge having two upper switches and two lower switches for selectively connecting the single phase winding to the power supply link.

7. The motor system of claim 1 further comprising a shaft in driving relation with the rotatable assembly for driving a rotatable component.

8. An inverter bridge for driving a motor, said motor having a rotatable assembly and a stationary assembly in magnetic coupling relation thereto, said stationary assembly including a winding, said motor also having a power supply link that includes an upper rail and a lower rail supplied by a power supply and having a control circuit for generating a motor control signal to control commutation of the winding, said bridge comprising:
   a set of upper power switches connected between the winding and the upper rail;
   a set of lower power switches connected between the winding and the lower rail, said lower switches receiving and responsive to the motor control signal, each of said lower switches corresponding to one of said upper switches, said switches each having a conducting state and a nonconducting state; and
   a drive circuit responsive to the state of the lower switches for driving the upper switches to selectively connect the rails of the power supply link to the winding whereby the winding is energized to produce an electromagnetic field for rotating the rotatable assembly relative to the stationary assembly, said drive circuit controlling the upper switches to provide a delay interval between the conducting states of the corresponding upper and lower switches thereby reducing shoot-through currents.

9. The bridge of claim 8 wherein the corresponding upper and lower switches that are connected to the same end of the winding define an arm of the bridge and wherein the state of each upper switch is determined by the state of its corresponding lower switch on the same arm of the bridge.

10. The bridge of claim 9 wherein the motor control signal defines commutation intervals during which one of the lower switches and one of the upper switches from different arms of the bridge are conducting to connect the winding to the upper and lower rails of the power supply link and wherein the drive circuit causes each upper switch to become nonconducting before its corresponding lower switch on the same arm becomes conducting.

11. The bridge of claim 8 wherein the switches comprise transistors each having a base electrode, an emitter electrode and a collector electrode and wherein the drive circuit includes a turn-off resistor connected between the base electrode of the upper switch and the collector electrode of its corresponding lower switch, said turn-off resistor being pulled down when the lower switch is conducting whereby the upper switch is maintained in its nonconducting state.

12. The bridge of claim 8 wherein the motor control signal generated by the control circuit is a function of a regulated current level representative of a desired speed and/or torque of the motor and wherein the drive circuit is responsive to the motor control signal for driving the switches to pulse width modulate the power provided to the winding at a duty cycle which is a function of the regulated current level thereby regulating motor current in the winding to control the speed and/or torque of the motor.

13. The bridge of claim 12 wherein the control circuit is responsive to the current regulation signal for controlling the switches so that one of the lower switches is used for pulse width modulating the power provided to the winding and wherein the drive circuit maintains the upper switch on the opposite arm of the bridge in its conducting state during pulse width modulation by the lower switch.

14. The bridge of claim 8 wherein the winding comprises a single phase winding and wherein the upper and lower switches comprise an H-bridge having two upper switches and two lower switches for selectively connecting the single phase winding to the power supply link.

15. A motor system comprising:
a rotatable assembly;
a stationary assembly in magnetic coupling relation to the rotatable assembly, said stationary assembly including a winding;
a power supply link having an upper rail and a lower rail supplied by a power supply;
a bridge circuit including a set of upper power switches connected between the winding and the upper rail and a set of lower power switches connected between the winding and the lower rail, said switches each having a conducting state and a nonconducting state, each lower switch corresponding to the upper switch on the same side of the winding as the lower switch, wherein the corresponding upper and lower switches define an arm of the bridge circuit and wherein the state of each upper switch is determined by the state of its corresponding lower switch on the same arm of the bridge circuit;
a control circuit for generating a motor control signal to control the switches, said lower switches receiving and responsive to the motor control signal, said motor control signal defining commutation intervals during which one of the lower switches and one of the upper switches from different arms of the bridge circuit are conducting to connect the winding to the upper and lower rails of the power supply link; and
a drive circuit responsive to the state of the lower switches for driving the upper switches to selectively connect the rails of the power supply link to the winding whereby the winding is energized to produce an electromagnetic field for rotating the rotatable assembly relative to the stationary assembly, said drive circuit having a lower turn-on resistor connected to each lower switch, said lower switches receiving and responsive to the motor control signal via the lower turn-on resistors, said lower turn-on resistors causing the lower switches to each turn on at a slower speed than the upper switch on the same arm of the bridge circuit turns off so that the upper switch becomes nonconducting before its corresponding lower switch on the same arm becomes conducting to provide a delay interval between the conducting states of the corresponding upper and lower switches thereby reducing shoot-through currents.

16. The motor system of claim 15 wherein the drive circuit includes an upper turn-on resistor connected to each upper switch, said upper switches being connected to a voltage source via the upper turn-on resistors, said upper turn-on resistors causing the upper switches to each turn on at a slower speed than the lower switch on the same arm of the bridge circuit turns off so that the upper switch becomes conducting after its corresponding lower switch on the same arm becomes nonconducting.

17. The motor system of claim 16 wherein the value of the upper turn-on resistor is greater than the value of the lower turn-on resistor.

18. The motor system of claim 16 wherein the switches comprise transistors each having a base electrode, an emitter electrode and a collector electrode and wherein the lower turn-on resistors are connected to the base electrodes of the lower switches and the upper turn-on resistors are connected to the base electrodes of the upper switches.

19. The motor system of claim 18 wherein the drive circuit includes a charge pump circuit for turning on the upper switch in response to the corresponding lower switch on the same arm of the bridge circuit turning off, said charge pump circuit comprising a diode connected between the upper turn-on resistor and the voltage source and a capacitor connected between the diode and the collector electrode of the corresponding lower switch.

20. An inverter bridge for driving a motor, said motor having a rotatable assembly and a stationary assembly in magnetic coupling relation thereto, said stationary assembly including a winding, said motor also having a power supply link that includes an upper rail and a lower rail supplied by a power supply and having a control circuit for generating a motor control signal defining commutation intervals to control commutation of the winding, said bridge comprising:
a set of upper power switches connected between the winding and the upper rail;
a set of lower power switches connected between the winding and the lower rail, said switches each having a conducting state and a nonconducting state, said lower switches receiving and responsive to the motor control signal, each of said lower switches corresponding to the upper switch on the same side of the winding as the lower switch, wherein the corresponding upper and lower switches define an arm of the bridge and wherein the state of each upper switch is determined by the state of its corresponding lower switch on the same arm of the bridge, wherein one of the lower switches and one of the upper switches from different arms of the bridge are conducting at the commutation intervals defined by the motor control signal to connect the winding to the upper and lower rails of the power supply link; and
a drive circuit responsive to the state of the lower switches for driving the upper switches to selectively connect the rails of the power supply link to the winding whereby the winding is energized to produce an electromagnetic field for rotating the rotatable assembly relative to the stationary assembly, said drive circuit including a lower turn-on resistor connected to each lower switch, said lower switches receiving and responsive to the motor control signal via the lower turn-on resistors, said lower turn-on resistors causing the lower switches to each turn on at a slower speed than the upper switch on the same arm of the bridge circuit turns off so that the upper switch becomes nonconducting before its corresponding lower switch on the same arm becomes conducting to provide a delay interval between the conducting states of the corresponding upper and lower switches thereby reducing shoot-through currents.

21. The bridge of claim 20 wherein the drive circuit includes an upper turn-on resistor connected to each upper switch, said upper switches being connected to a voltage source via the upper turn-on resistors, said upper turn-on resistors causing the upper switches to each turn on at a slower speed than the lower switch on the same arm of the bridge turns off so that the upper switch becomes conducting after its corresponding lower switch on the same arm becomes nonconducting.

22. The bridge of claim 21 wherein the value of the upper turn-on resistor is greater than the value of the lower turn-on resistor.

23. The bridge of claim 21 wherein the switches comprise transistors each having a base electrode, an emitter electrode and a collector electrode and wherein the lower turn-on resistors are connected to the base electrodes of the lower switches and the upper turn-on resistors are connected to the base electrodes of the upper switches.

24. The bridge of claim 23 wherein the drive circuit includes a charge pump circuit for turning on the upper switch in response to the corresponding lower switch on the same arm of the bridge turning off, said charge pump circuit comprising a diode connected between the upper turn-on resistor and the voltage source and a capacitor connected between the diode and the collector electrode of the corresponding lower switch.

* * * * *